(12) United States Patent
Sullivan

(10) Patent No.: US 10,626,585 B1
(45) Date of Patent: Apr. 21, 2020

(54) SEWER BACK-FLOW PREVENTER MONITOR

(71) Applicant: Aaron Dale Sullivan, Windsor (CA)

(72) Inventor: Aaron Dale Sullivan, Windsor (CA)

( * ) Notice: Subject to any disclaimer, the term of this patent is extended or adjusted under 35 U.S.C. 154(b) by 0 days.

(21) Appl. No.: 16/361,612

(22) Filed: Mar. 22, 2019

Related U.S. Application Data

(60) Provisional application No. 62/761,423, filed on Mar. 23, 2018.

(51) Int. Cl.
| | | |
|---|---|---|
| *E03C 1/12* | (2006.01) | |
| *G01D 5/14* | (2006.01) | |
| *G08B 29/18* | (2006.01) | |
| *G08B 7/06* | (2006.01) | |
| *F16K 15/03* | (2006.01) | |

(52) U.S. Cl.
CPC ............... *E03C 1/12* (2013.01); *F16K 15/03* (2013.01); *G01D 5/145* (2013.01); *G08B 7/06* (2013.01); *G08B 29/185* (2013.01)

(58) Field of Classification Search
CPC ........... E03C 1/12; F16K 15/03; G01D 5/145; G08B 7/06; G08B 29/185
See application file for complete search history.

(56) References Cited

U.S. PATENT DOCUMENTS

| | | | | |
|---|---|---|---|---|
| 3,896,280 A | | 7/1975 | Blake | |
| 4,392,128 A | * | 7/1983 | Young | E03F 7/00 137/557 |
| 4,494,345 A | * | 1/1985 | Peterson | E03F 7/04 137/414 |
| 4,546,346 A | * | 10/1985 | Wave | E03F 7/00 200/61.2 |
| 4,624,280 A | * | 11/1986 | DePirro | E03F 7/04 137/392 |
| 4,922,234 A | * | 5/1990 | Murphy | E03F 7/00 200/84 R |
| 5,406,972 A | * | 4/1995 | Coscarella | E03F 7/04 137/315.08 |
| 9,123,230 B2 | * | 9/2015 | Rogers | G08B 21/182 |
| 10,032,357 B2 | * | 7/2018 | Dunn | E03F 7/00 |
| 10,533,312 B2 | * | 1/2020 | Gibson | G08B 21/182 |
| 2013/0220449 A1 | * | 8/2013 | Dawes | D06F 39/082 137/398 |
| 2014/0324406 A1 | * | 10/2014 | Nesbitt | E03F 3/00 703/9 |
| 2016/0002842 A1 | * | 1/2016 | Dawes | G05D 9/12 137/398 |
| 2016/0240066 A1 | * | 8/2016 | Dunn | E03F 7/00 |
| 2018/0094416 A1 | * | 4/2018 | Gibson | E03F 7/00 |

\* cited by examiner

*Primary Examiner* — Nay Tun

(57) ABSTRACT

The Sewer Back-flow Preventer Monitor is a device designed to be an add-on to a sewer back-flow preventer valve, otherwise known as a backwater valve. It offers a higher level of protection against flood than that which is offered by a sewer backwater valve without any such device. It uses digital and/or analog electrical sensors, magnetically linked to the flapper, to determine the precise flapper position of a backwater valve and will warn a user of a municipal sewer backup and or back-flow. As well, it will provide an alert when a cleaning is necessary and informs users when a sewer backwater valve has successfully closed during an event. It is a cost effective solution.

3 Claims, 5 Drawing Sheets

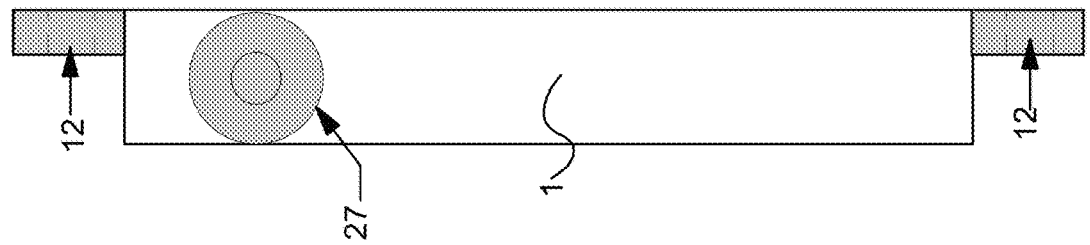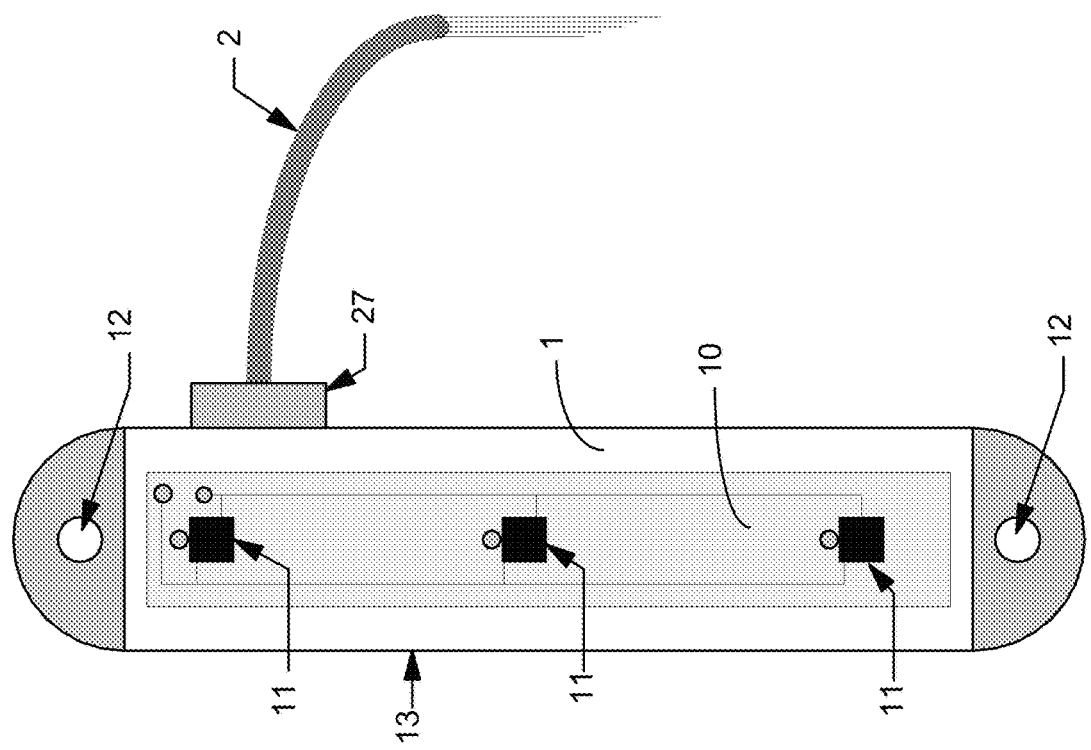

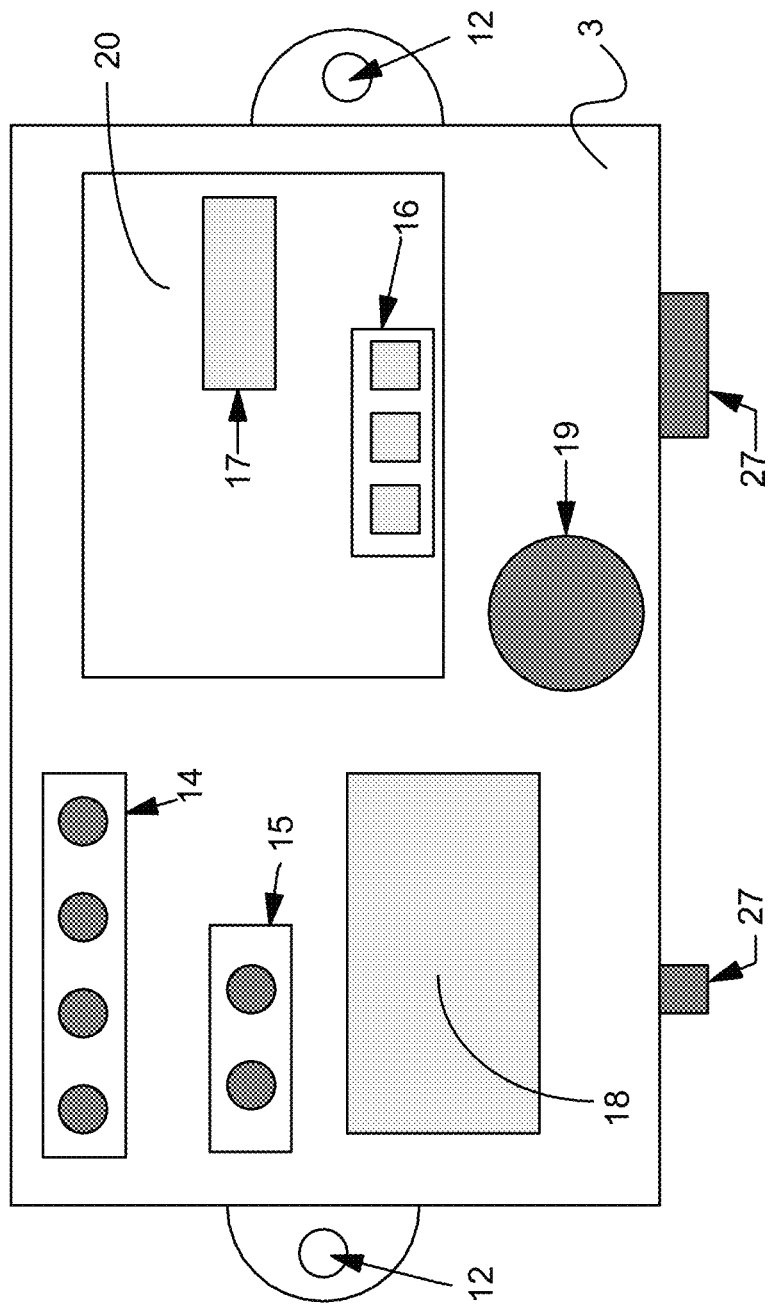

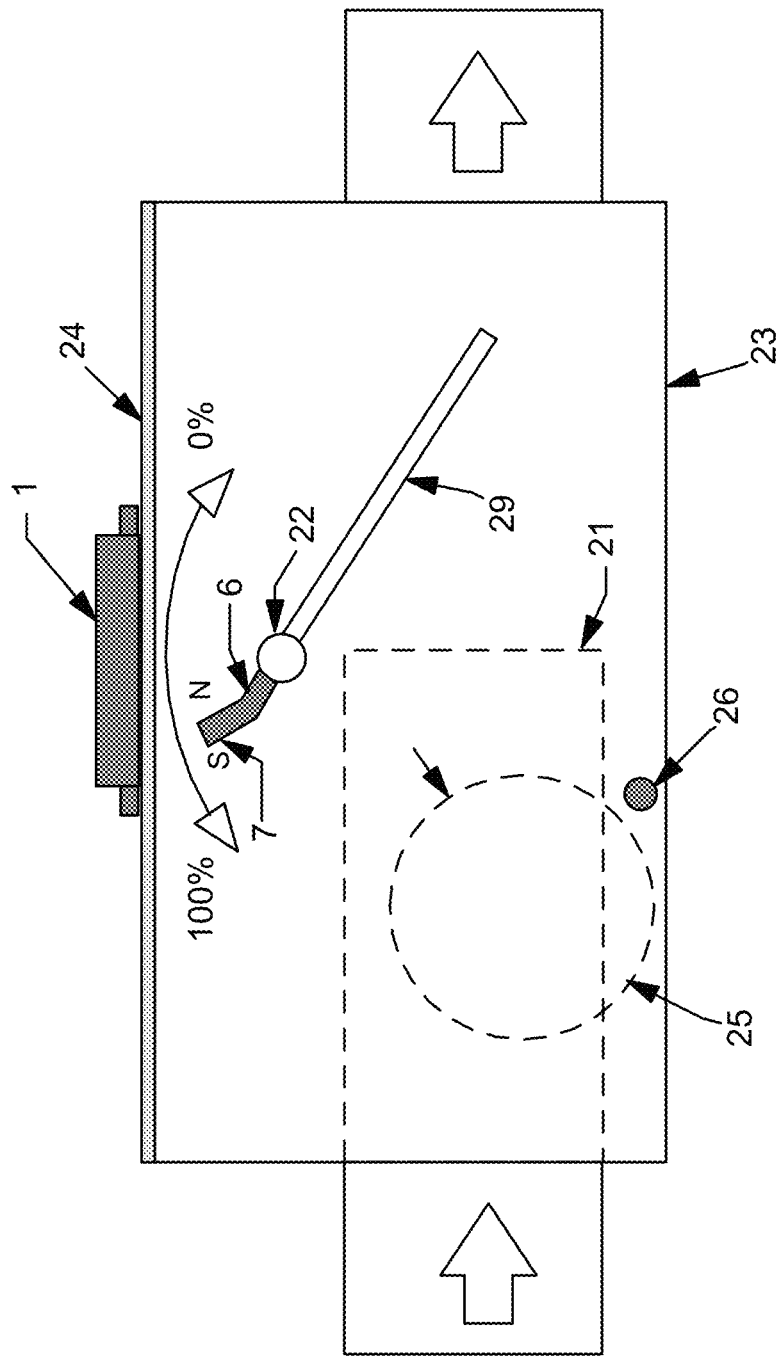

SEWER BACK-FLOW PREVENTER MONITOR

CROSS REFERENCE TO RELATED APPLICATIONS

1) Application No. 62/761,423 (provisional application)

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1) This invention is electro-mechanical. It involves electrical feedback of a mechanical device and falls under the CPC section H. It attaches to a sewer back-flow preventer valve, otherwise known as a backwater valve, made by others.

2) Due to an intense storm causing flooding in our area, we experienced a municipal sewer back-flow into the basement of our primary residence as well as an equal back-flow of sewer water into the basements of the homes of our near living families. In the aftermath of this event, and the subsequent insurance claims and rebuilding, the insurer insisted that sewer back-flow prevention be installed in our homes so that our policy could be continued.

3) During our preparations for the installation of our sewer back-flow preventer valve, otherwise known as a backwater valve, the contractor made it clear that an installed sewer back-flow preventer valve comes with some challenges. The first challenge was the need for the periodical cleaning of the valve to ensure proper functioning of the valve. If the valve were to become filled with debris, the valve could fail to close properly and fully during an event of a municipal sewer back-flow, allowing flooding which the valve was supposed to prevent.

4) The question arose, how would one know if the valve was becoming impaired with dirt and in need of cleaning. A regular regimen of cleaning would prove useful but will not compensate for variance in usage. Also, neglect is a consequence of a busy lifestyle.

5) The second concern was in regard to the valve operating properly during an event of municipal sewer back-flow. If an event were to occur that resulted in the sewer back-flow valve successfully closing, then municipal sewer contents would be prevented from flooding the basement. However, a closed sewer back-flow preventer valve would also prevent the egress of wastewater generated by the occupants within the dwelling. This would result in secondary flooding, as wastewater would back up into the basement through the floor drain or a downstairs shower drain or even a toilet.

6) The contractor was queried on these issues but was unable to offer an alarm for the closure of the valve, nor had they any idea concerning a device that could warn the homeowner of a dirt impaired valve.

7) An internet search was started for a device that could be attached to the sewer back-flow preventer valve to offer some sort of warning. Feedback from the contractor indicated that other homeowners who also had a valve installed were concerned with these issues as well. Some individuals had gone as far as home fashioned devices that could warn of a closed valve.

8) As I was unable to locate a device that provided a comprehensive solution, I set about to design my own. It was a challenge because I did not want to do anything to the back-flow preventer valve,—which was supplied by the contractor in advance—such that they would refuse to install it. I also did not want to do anything to the valve that might cause the plumbing inspector to disapprove of the installation of the sewer back-flow preventer. Thus, the design was made as unobtrusive as possible and constructed to be obviously harmless to the main purpose of the sewer back-flow preventer valve. The installation was successful. The plumbers felt the attached device was satisfactory and the installation also passed city inspection.

9) The prototype installed at my principle residence was designed and constructed within a narrow timeframe due to constraints placed upon us by the insurance company and the contractor. However, it was my intention to build a device that could also be installed upon a preexisting valve in order to satisfy strong retail demand for such a device. The prototype used the simplest methods of construction in order to fit our allotted time. The final designs could either be part of the backwater valve when manufactured by the backwater valve OEM or be an 'off the shelf', installed by homeowners with some technical ability.

10) In my initial search for a device that would offer some type of alert, I found one device online that offered some protection. It was sold by an online distributor at http://www.backwater-valves.com/flood-alarm.asp. This device works by sensing continuity between two electrical probes and I considered this device, however it has its drawbacks. The metal probes will corrode and/or be coated with residue and is hence unreliable. It does not inform residents as to whether a backwater valve has actually closed, but merely alarms if municipal sewer water is backing up, if it is in fact in working order at all. Neither does it offer any alert as to the buildup of debris in the valve. I searched for an associated patent for this device and found "Sewer alarm apparatus having a probe", U.S. Pat. No. 10,032,357, application Ser. No. 15/137,599. This design focuses on "detecting the presence of liquid within a pipe" Cite 7, and may not be associated with the device at the website mentioned, although its function appears identical. This idea does not achieve the needed result and is subject to corrosion and failure.

11) Once my search for a patented device began, I decided to file a provisional patent application No. 62/761,423 for my Sewer Back-flow Preventer Monitor. I continued my search for devices and found "Sewer alarm" U.S. Pat. No. 4,922,234, application Ser. No. 07/275,371. This device contains a "buoyant mercury switch tethered" Cite 4, to sense high water level. As an electrician working in the manufacturing industry for almost 40 years, I know this to be a poor application. Sewage is constantly moving through this valve. This switch will fail quickly and also it can impair the function of the valve. It will get coated with sewage and block the flow. Also, it offers no alert of the valve's sediment buildup.

12) Another patent I observed is "Sewer backup alarm" U.S. Pat. No. 9,123,230, application Ser. No. 13/894,153. This alarm "includes a float device and a wireless alert device" Cite 5. Again, experience shows that this float switch will become coated with sewage and fail. Also, it offers no alert for debris buildup in the valve.

13) I looked at "Sewer line backup detection, alarm and detention apparatus" U.S. Pat. No. 4,546,346, application Ser. No. 06/475,688. This device, a "pneumatic switch is actuated by a flexible diaphragm" Cite 3. is also poor construct. These switches a notorious for failure, more so in this environment. This switch will get plugged up in short order and the diaphragm will decay. The final patent I discovered which bore similarities to what I intended to build is covered under pending application U.S. Ser. No. 15/720,925 and is an "apparatus for detecting an impending sewer backup by detecting fluid undulations of predetermined magnitude" Cite 1, the focus of this device is predictive. This device is a non-starter, as it is designed for a valve which municipalities have been steering away from. The reason being the flapper of this valve rests on the bottom of the valve housing and will glue to the bottom in the sediment, hence it will not close and a flood ensues. This design uses a "tilt switch carried by the gate" Cite 2, which can only demonstrate a single position of the flapper, and as such, cannot offer a user an alarm when the valve needs cleaning. Nor can it offer an alarm if the switch is being used for 'predictive purposes', as outlined in the application. This wireless switch would be positioned on the inside of the valve, in the sediment. It is not practical, as the battery will have to be replaced and there will not be the will to dismantle the valve, clean the switch from the nasty stuff, and change the battery. This application also postulates the possible use of "a sensor for sensing fluid undulations of predetermined magnitude" Cite 8, without detailing what type of sensor it is. However, based on the requirements described, it would be a costly sensor, multiples of the price of the valve itself. It is therefore not cost effective.

12) I searched for a patent that utilized reed switches or a magnetometer and a magnet to indicate valve position. I found only "Valve position indicator" Cite 6, U.S. Pat. No. 3,896,280A, an apparently expired patent. My prototype utilizes a similar device as this, but within the context of a sewer backwater valve instead of an automotive valve, much in the same way the aforementioned patents utilized existing hardware within the context of their patents. For example, a pressure switch or a float switch, or a continuity switch, all devices that have previously been patented.

BRIEF SUMMARY OF THE INVENTION

1) The Sewer Back-flow Preventer Monitor is an electrical monitoring device to be added to a sewer back-flow prevention valve. It consists of a sensor, a magnet and a connected indicating circuit within the Controller. The indicating circuit has provision to connect to home alarm systems and to internet enabled devices. The Controller itself could also be fitted with a wireless module to connect to home WiFi and r&d is ongoing for the best working system. The Sewer Back-flow Preventer Monitor performs two important tasks. Firstly, it alarms homeowners when their installed sewer back-flow valve is fully closed, or partially such, during an event of municipal sewer backflow. Secondly, it will alert homeowners to the need for cleaning of the sewer back-flow preventer valve. It can perform both functions even while users are away, where internet connected devices, made by others, are utilized, or where the Controller is fitted with a WiFi module.

2) During a municipal sewer back-flow event causing the backwater valve to be closed, an alarm will warn the occupants of a dwelling in order that they not to use plumbing fixtures within the dwelling to prevent secondary flooding.

3) Sewer back-flow preventer valves should be routinely cleaned of residue that builds up in the bottom of the valve. In this instance the Sewer Back-flow Preventer Monitor would cause an alert to be generated, informing the occupants that the back-flow preventer valve was in need of attention.

4) Other systems which are designed to alarm in the case of a municipal sewer backup event do not offer the same protections that the Sewer Back-flow Preventer Monitor does. The other systems do not indicate that one's backwater valve is actually closed during an event of backup, rather they only hope to alarm persons when there is water in the valve, something that, in the case of a failed valve, they would already be aware of because of the copious amounts of water in their basement. Neither do they offer any alert concerning the buildup of unwanted material inside the backwater valve which could impair its operation.

5) Other systems do not offer the robust performance of the Sewer Back-flow Preventer Monitor which is designed to be unaffected by the disagreeable environment within the valve. Other systems use methods of detection that are inadequate and have over time proven to fail. These other systems do not last, they get plugged up and decay. Other than a known system that uses continuity to sense high water, none of these other systems are available for purchase at retail, most likely for reasons discussed here.

6) The object of the Sewer Back-flow Preventer Monitor is to keep homeowners appraised of the health of their installed sewer back-flow preventer valve and to alert them when attention is needed, whether that be the valve's need for cleaning or its status during a sewer backup event. It offers the peace of mind that only a Sewer Back-flow Preventer Monitor can, by making homeowners aware that their valve has successfully and completely shut, preventing a flood. When the Sewer Back-flow Preventer Monitor is connected to the internet using a variety of interfaces, it offers a homeowner, even when away from home, an alert that gives confidence and creates calm during a municipal sewer backup event.

BRIEF DESCRIPTION OF THE SEVERAL VIEWS OF THE DRAWINGS

2) FIG. 2 and FIG. 3 is the sensor 1. A front view FIG. 1 with internal contents shown and a side view FIG. 2.

3) FIG. 4 shows the controller 3. The indicator LED's array 14, the Horn 19 and the pushbutton switches array 15 for silencing the alarm and setting up the throw on the valve are dark shaded to demonstrate the exterior. On the interior is seen the battery 18 and the micro controller 17 and output relays array 16.

Figure 1:
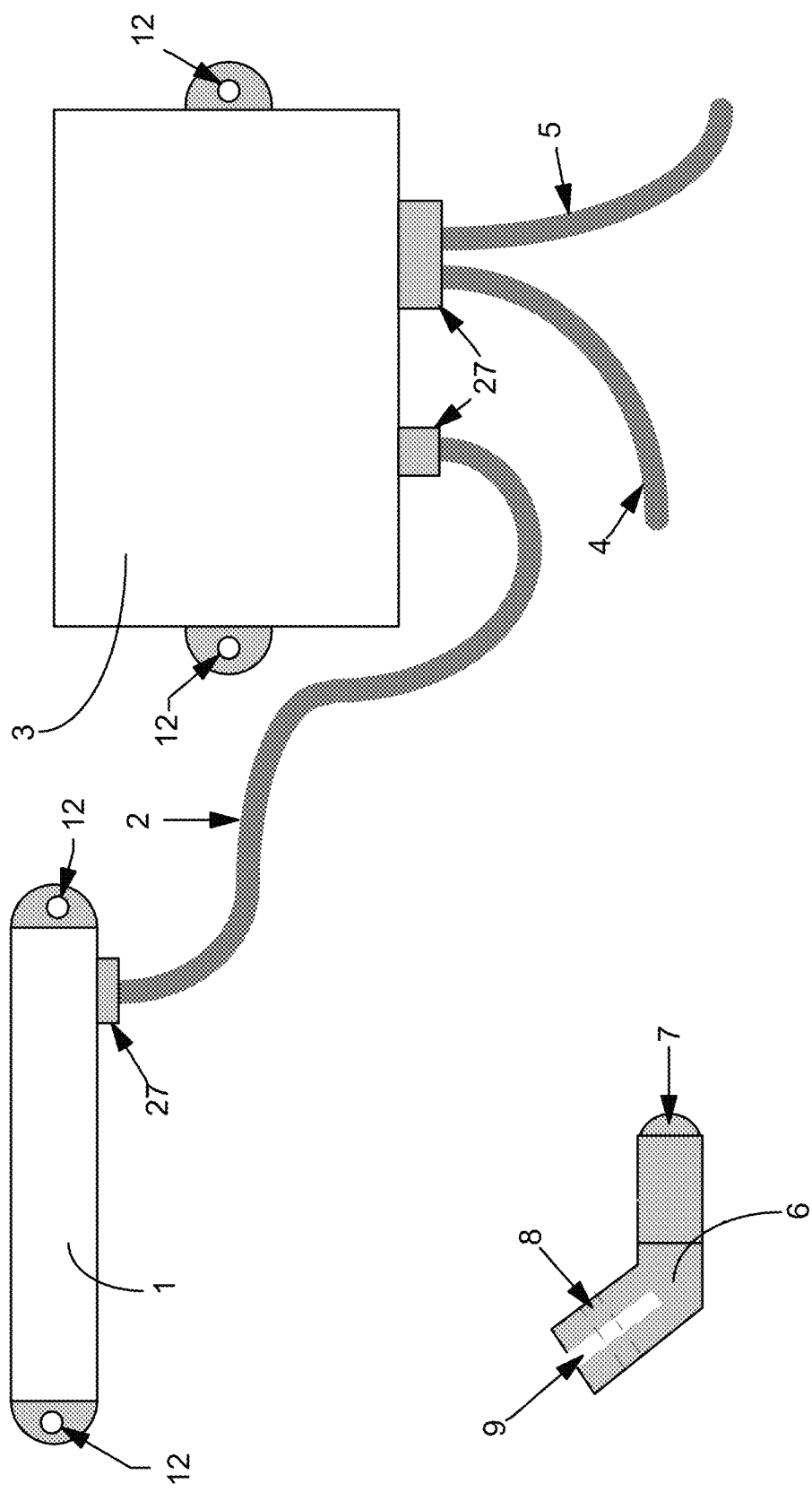
FIG. 1 is a general layout showing how the full working system would be assembled. The Sewer Back-flow Preventer Monitor sensor, to be mounted on the valve housing lid 24, the connected wiring to the controller 2,27, the controller 3 with its associated wiring 2,4,5,27 and the magnet arm 6 containing a neodymium magnet 7.

5) FIG. 6 again shows the sewer back-flow preventer valve 23 from the side opposite the ball float, with the Sewer Back-flow Preventer Monitor sensor 1 mounted on the lid 24 and the offset magnet arm 7 mounted on the flapper hinge 6. Seen here is the ball float 25 at the other side and indicated by sediment accumulation 26 is the area under the ball float where sediment will accumulate.

DETAILED DESCRIPTION OF THE INVENTION

1) The Sewer Back-flow Preventer Monitor works by live reporting of the position of the flapper in an installed sewer back-flow preventer valve, and then issuing an alert or alarm based on that position. Hereafter, the sewer back-flow preventer, or backwater valve will be abbreviated to "valve", and the Sewer Back-flow Preventer Monitor will be abbreviated to the acronym SBPM. The valve that is referred to herein is model ML-FR4 from OS&B Mainline products. It is covered by USA patent 4503881 as disclosed in PTO/SB/08a and found at https://www.backwater-valves.com/ML-FR4-Mainline%20Backwater-Valve-Fio-Valve.asp. Their drawings are not included within this specification. The municipality in which the prototype, described herein, is installed ceased to allow, to be installed, the older style back-flow preventer manufactured by the same company. The reason is, it had proven to fail in the open position causing a flood, specifically, their back-flow preventer valve with the flapper on the bottom. This is the same failed valve mentioned in the Background section, with reference to USA patent application U.S. Ser. No. 15/720,925.

2) The position of the valve flapper 29 changes with regard to real world conditions. There are four positions that are of importance. Firstly, during normal use operation of the valve with 100 percent throughput of wastewater, the valve flapper should be fully open and the SBPM will indicate normal function of the valve.

3) Secondly, when the valve has built up a level of debris 26 (FIG. 6), causing the valve flapper to be less than fully open, approximately at 90% open, the SBPM will indicate a need for cleaning.

4) Thirdly, during a municipal sewer back-flow of wastewater, the valve flapper may not fully close due to debris which could lodge between the valve flapper 29 and its seat 21. The SBPM sensor will indicate that the valve is more than fifty percent closed but not fully closed and the controller will issue a strong alert indicating that the valve has failed and almost certain flooding conditions exist.

5) Fourthly, during a municipal sewer backup or back-flow of wastewater, the valve flapper is fully closed when successful, preventing back-flow and flooding. This would be zero percent open. An alarm is issued warning occupants against the use of plumbing fixtures within the dwelling, or other building where they valve is installed, so that secondary flooding is prevented.

6) Connections 5,16,27 are available on the SBPM controller to allow for the use of internet connected devices made by others, such that in the event of a municipal sewer back-flow, persons could be informed that they have been spared a flood.

7) The construction of the Sewer Back-flow Preventer Monitor is as follows.

8) The SBPM is comprised of a sensor 1, a magnet 7 with attaching arm 6 and a controller 3 with associated wiring. (FIG. 1)

Figure 5:
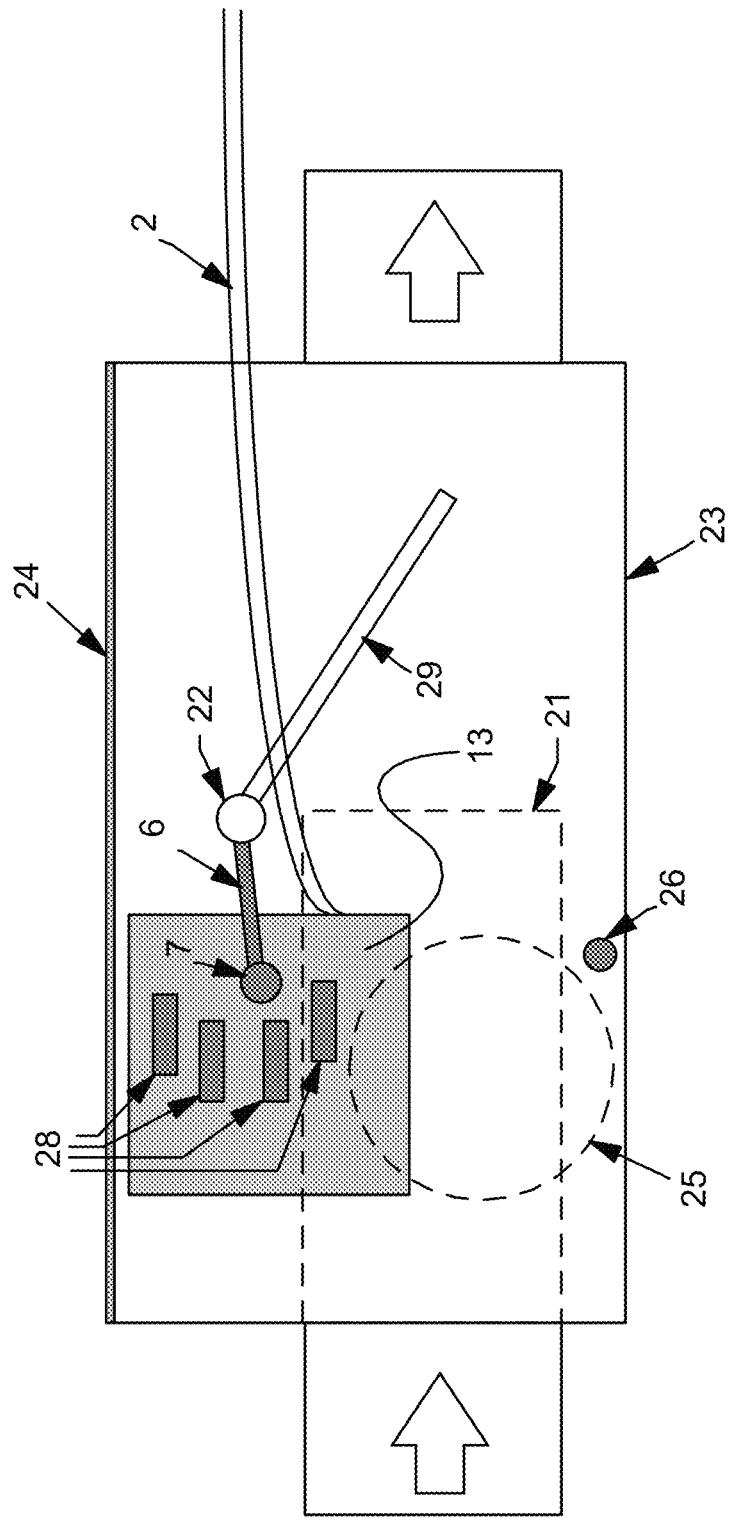
FIG. 5 shows the valve with the installed prototype on the side of the valve opposite the ball float 25. It was used as proof of concept and continues to provide our home safety. It utilizes reed switches 28 and a side mounted switch assembly 13. Although working well, this is not advised for retrofit applications, as this area of the valve is mostly inaccessible after valve installation.

9) The position sensor 1, (FIG. 1,2,3,5) is comprised of a watertight enclosure 13 containing a circuit board 10, the circuit board bearing a minimum of three Hall-effect transistors 11, (FIG. 2) shown, or four reed switches 28 if factory installed (FIG. 5). When reed switches are used, more precise placement of the sensor module is required, and also a more precise installation of the magnet arm 6. The function of the reed switch sensor can only be adjusted mechanically, by repositioning. Hence, reed switches are not shown as it has been determined that their use does not facilitate the "best mode contemplated" when a retail use is the focus.

10) The prototype (FIG. 5) utilizes four reed switches 28 and demonstrates well the value of this invention, however, this was a meticulous installation by myself. The prototype does not utilize a controller 20 as does the Hall-effect transistor 11 design (FIG. 2, FIG. 5) described within this specification. The prototype is directly connected to a security alarm system and offers its full function through the security alarm interface keypads. The prototype illustrates well how a good result could be achieved if a manufacturer of backwater valves chose to implement this idea during the manufacture of their valve, as an improvement. However, the invention described within (FIG. 1,6) utilizes Hall-effect transistors 11 and a micro controller 17 as this method can find better success as a user installable device.

11) The sensor 1, using three Hall-effect transistors 11 is seen in FIG. 2. The transistors are mounted on a circuit board 10, one on each end over its length and the third in the middle. They are supplied their working voltage by means of connected cable 2, also as seen in FIG. 1, that issues from the controller module and the transistor's output is fed back the the controller module. The sensor housing 13 is made of plastic and is sealed during manufacture. The sensor is four inches long and three-quarters of an inch wide. Taking into account that this device is an add-on to an existing product, these dimensions could vary, depending on the target valve, as no two valve manufacturers are identical. This design, however, was intended to become universal. The sensor 1 is to be mounted on the cover 24 of the valve housing, over top of the flapper hinge 22 and on the side opposite the float ball as seen in FIG. 6. It will receive magnetic force from the moving magnet 7 below it through the magnet's arc of travel and will generate a signal to be processed by the micro controller 17 in the controller enclosure.

12) The magnet arm 6 containing the magnet 7 is to be mounted directly on the flapper hinge 22, inside the valve housing 23. (FIG. 1, FIG. 6). It is made of plastic and the magnet is integral. The arm is offset according to the manufacture of the particular valve it is to be installed upon, such that the arc of travel is uniform from open to closed positions of the flapper. In the case of the valve that was used for proof of concept, the arm is slid onto the flapper hinge so that the hinge rests inside the mounting slot, with the arm facing upwards. This is done on the side opposite the ball float 25. A hole is drilled through the fastening hole 8, (FIG. 1), and through the flapper hinge. A stainless steel screw with a nut are used to secure the arm. The offset allows the magnet to travel in an arc just below the lid of the valve, underneath the Sensor.

13) With the magnet arm fastened to the flapper hinge, the magnet will travel in an arc, in the opposite direction of the flapper. (FIG. 6). When the flapper is fully open, the magnet is toward the inlet end of the valve at 100%. As the float ball rises with the water level, the flapper begins to close and the magnet travels forward, toward the outlet end of the valve. When the flapper is fully closed, the magnet is at the end of its travel toward the outlet end of the valve at 0%.

14) The correct sensor position is discovered by placing it on top of the valve cover, directly over the installed magnet arm and with the controller connected and energized and the valve fully open. The controller indicator for position 1 will illuminate when the valve is in position. The valve flapper must be physically operated to its closed position in order to establish the proper setting on the controller. To operate the valve flapper manually on the valve used for this specification, a small hole must be drilled in the cover, through which a narrow rod can be inserted to push the flapper shut. This hole will be sealed with a removable plug until it is time to test the system, most probably at the time of valve cleaning.

15) The controller can remain with the valve in the valve pit, however it will be more difficult to hear the alarms and alerts in this position. It is preferable that the controller be outside of the valve pit and mounted on the near outside wall where the valve is installed. For this to be the case, a corridor for the connecting cable A must be established. This is accomplished without difficulty during valve installation, however this would otherwise require cutting a concrete floor. In cases where it is not possible to have the controller mounted outside of the valve pit, it may remain in the pit, underneath the pit's cover. It is prudent to connect the controller, using the relay outputs, to a security alarm system, directly or wirelessly. Or, to an internet enabled device capable of issuing a text or email. Future iterations of the Controller will offer direct WiFi connectivity.

16) The SBPM Controller uses a programmable micro controller integrated circuit, selecting from one of many cost effective micro controllers readily available and the micro controller will be programmed according to the programmer's style. It is programmed using the table below.

| Programming Table 1 | | | | | | | | | | | |
| --- | --- | --- | --- | --- | --- | --- | --- | --- | --- | --- | --- |
| Status | Pos. | L1 | L2 | L3 | L4 | A1 | A2 | ALM | R1 | R2 | R3 |
| Open | >97% | On | Off | Off | Off | Off | Off | Off | Off | Off | Off |
| Need cleaning | 96-80% | Off | On | Off | Off | On | Off | Off | On | Off | Off |
| Valve failure | 79-4% | Off | Off | On | On | Off | Off | On | Off | On | On |
| Valve closed | >3% | Off | Off | Off | On | Off | Off | On | Off | On | Off |
| Low Battery | NA | Flash | Off | Off | Off | Off | On | Off | Off | Off | Off |

See FIG. 4, where L1-L4 14 indicate valve position and battery.

17) A1 is a minor Alert that indicates a need for cleaning. It may be temporarily silenced by depressing both pushbutton switches on the controller. A2 is minor alert to battery condition. R1, R2 and R3 16 are relay outputs to provide connectivity to home security systems and other internet connected devices by others. They relate to the alerts and alarm as seen in the above Programming Table. The nomenclature marked on the Controller face would indicate the action to be taken.

18) The micro controller is able to be updated from time to time if necessary, as more data is retrieved from the field, such that nuisance alerts can be eliminated.

19) The Hall-effect transistors 11 mounted within the Sensor 1 (FIG. 2) will output a small voltage, and the position of the moving magnet mounted on the flapper hinge beneath it (FIG. 6) will cause the voltage from the three transistors to rise and fall and change polarity. These voltages are input to the micro controller 17 (FIG. 4) analog inputs and the programmed micro controller extrapolates the valve position. Digital outputs on the micro controller energize the relays 16.

20) Seen in FIG. 1, the outputs from the relays are available by means of Cable 5. Cable 4 is for supply voltage from a remote power source.

21) The alert for valve cleaning is determined by the valve position, that being less than fully open, see Table 1, and this condition persisting for longer than the set time of 1 hour. This is to eliminate nuisance alerts from flapper movements during normal usage. Thus, a user would be alerted to a buildup of debris in the bottom of the valve.

22) The alarm for valve failure and the alarm for successful valve closure during an event of backup or back-flow would be instantaneous. All alarms and alerts can be cancelled with the use of the push button controls when inspecting the situation.

The invention claimed is:

1. A Sewer Back-flow Preventer Monitor device which monitors a position of a flapper in a sewer back-flow preventer valve and configured to broadcast an alert or an alarm related to the position of said flapper, said device comprising:
  a) a neodymium magnet mounted on the upper edge of said flapper of said back-flow preventer valve by means of an attaching arm, said magnet moving in conjunction with said flapper, said attaching arm having the sole purpose of supporting said magnet,
  b) a sensor mounted on the outer surface of a sewer back-flow preventer housing within range of the fluctuating magnetic force of said magnet throughout the range of the movement of said magnet, said sensor constructed using a moulded water-tight non-metallic enclosure, said sensor comprising three individual Hall-effect sensors arranged in tandem as an aggregate so as to receive sufficient force from said magnet as said magnet moves in conjunction with said flapper through the entire range of movement of said flapper,
  c) an indicating circuit, said circuit being electrically connected to said sensor, said circuit comprising a programmable micro-controller, a program, a relay array to connect other devices, a light emitting diode (LED) array to display valve position and micro-controller programming, a pushbutton array for input, an audible horn, a wireless communication module and a power supply.

2. The device according to claim 1, wherein said indicating circuit broadcasting an alert or an alarm when identified conditions exist, wherein;
  a) when said flapper is less than fully open but more than three quarters open demonstrating a need for cleaning of the sewer back-flow preventer valve, a delayed low intensity alert is broadcast, and
  b) when said flapper is less than three quarters open or fully closed demonstrating a municipal sewer back-flow event, an instant alarm of high intensity is broadcast.

3. The device according to claim 1, wherein said sensor is mounted using a through hole in said housing constructed of a metallic material to ensure conduction of magnetic force from said magnet to said sensor.

* * * * *